US008631279B2

(12) United States Patent
Yildiz et al.

(10) Patent No.: US 8,631,279 B2
(45) Date of Patent: Jan. 14, 2014

(54) PROPAGATING UNOBSERVED EXCEPTIONS IN DISTRIBUTED EXECUTION ENVIRONMENTS

(75) Inventors: Huseyin Serkan Yildiz, Kenmore, WA (US); Massimo Mascaro, Redmond, WA (US); Joseph E. Hoag, Kenmore, WA (US); Igor Ostrovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 13/155,263

(22) Filed: Jun. 7, 2011

(65) Prior Publication Data

US 2012/0317447 A1  Dec. 13, 2012

(51) Int. Cl.
*G06F 11/07* (2006.01)
(52) U.S. Cl.
USPC ............................ 714/38.1; 714/48; 714/57
(58) Field of Classification Search
USPC ............................................ 714/38.1, 48, 57
See application file for complete search history.

(56) References Cited

U.S. PATENT DOCUMENTS

| 6,823,448 | B2 | 11/2004 | Roth | |
|---|---|---|---|---|
| 7,320,125 | B2 | 1/2008 | Elliott | |
| 2004/0250175 | A1* | 12/2004 | Draine et al. | 714/46 |
| 2005/0246716 | A1* | 11/2005 | Smith et al. | 719/315 |
| 2008/0010564 | A1* | 1/2008 | Chrysanthakopoulos et al. | 714/57 |
| 2008/0320275 | A1* | 12/2008 | Duffy et al. | 712/28 |
| 2008/0320291 | A1* | 12/2008 | Duffy et al. | 712/244 |
| 2009/0276754 | A1* | 11/2009 | Lind et al. | 717/106 |
| 2010/0146522 | A1 | 6/2010 | Duffy | |
| 2010/0185840 | A1* | 7/2010 | Duffy et al. | 712/244 |
| 2010/0269091 | A1* | 10/2010 | Barnes et al. | 717/106 |
| 2011/0088043 | A1* | 4/2011 | Lind et al. | 719/316 |
| 2012/0124426 | A1* | 5/2012 | Maybee et al. | 714/38.11 |

OTHER PUBLICATIONS

MSDN, "Parallel Tasks", Based on information and belief available, at least as early as Jan. 27, 2011, 19 pages.
Oracle Database Application Developer'S Guide—Fundamentals, "Using Procedures and Packages", at least as early as Jan. 27, 2011, 59 pages.
Microsoft, "Exception Management in .NET", 2003, 36 pages.
MSDN, Microsoft Application Architecture Guide (2nd Edition), "Chapter 21: Designing Web Applications",at least as early as Jan. 27, 2011, 13 pages.
Vyzovitis, Dimitris, et al., "MAST: A Dynamic Language for Programmable Networks", May 31, 2002, 28 pages.
Brooke, P.J and Paige, R.F., "Exceptions in a Concurrent Effie", Journal of Object Technology, vol. 6, No. 10, Nov.-Dec. 2007, pp. 111-126.

* cited by examiner

*Primary Examiner* — Chae Ko
(74) *Attorney, Agent, or Firm* — Workman Nydegger (57) ABSTRACT

The present invention extends to methods, systems, and computer program products for propagating unhandled exceptions in distributed execution environments, such as clusters. A job (e.g., a query) can include a series of computation steps that are executed on multiple compute nodes each processing parts of a distributed data set. Unhandled exceptions can be caught while computations are running on data partitions of different compute nodes. Unhandled exception objects can be stored in a serialized format in a compute node's local storage (or an alternate central location) along with auxiliary details such as the data partition being processed at the time. Stored serialized exception objects for a job can be harvested and aggregated in a single container object. The single container object can be passed back to the client.

20 Claims, 3 Drawing Sheets

PROPAGATING UNOBSERVED EXCEPTIONS IN DISTRIBUTED EXECUTION ENVIRONMENTS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Applications targeted for a distributed execution environment ("distributed applications") are typically designed to execute the same code (or similar copies of it) on many different computers, each applying it to different segments of a larger data set. In general, distributed applications are inherently more complex than applications targeted to stand alone systems. The complexity is due at least in part to execution of distributed applications spanning computer systems and/or computing environments. This complexity also makes it more difficult to develop distributed applications.

Propagation and handling of failures is one particular challenge that makes it more difficult to develop distributed applications. Underlying code can fail in different ways when running on compute nodes to process different parts of the data. Further, overall processing can have relatively long durations. Different types of failures and long durations (possibly in combination with other execution characteristics) can make tracking down and diagnosing the root cause of failures difficult. As such, application developers may build custom error propagation solutions to assist with identifying and correcting failures in distributed applications.

BRIEF SUMMARY

The present invention extends to methods, systems, and computer program products for propagating unobserved exceptions in distributed execution environments. A data processing plan is received from a client. The data processing plan defines how a data access request for specified data from within a distributed data set is to be executed across a plurality of compute nodes within the compute node cluster. The data processing plan includes a plurality of different stages. Each different stage defines a type of processing that is to be performed on data within the distributed data set.

The data processing plan is orchestrated on the compute node cluster by executing one or more of the plurality of different stages of the data processing plan. For each stage, one or more of the compute nodes are instructed to execute instructions against data within or derived from one or more data partitions of the distributed data set. For each stage, the one or more of the compute nodes are also instructed to catch any encountered unhandled exceptions occurring during execution of the instructions against the data within or derived from one more data partitions. Each unhandled exception indicates at least one of: a failure at a particular node or a failure at a particular stage of the data processing plan. For each stage, the one or more of the compute nodes are also instructed to store encountered unhandled exceptions along with corresponding auxiliary data in a designated storage location. The corresponding auxiliary data associates each of the unhandled exceptions with the data partition, from among the one or more data partitions, that lead to the unhandled exception.

Stored unhandled exceptions are harvested along with corresponding auxiliary data. The harvested unhandled exceptions are aggregated along with corresponding auxiliary data into one or more container objects. The one or more container objects convey details of compute node and stage failures that happened during orchestration of the data processing plan. The one or more container objects are sent to the client.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for propagating unobserved exceptions in distributed execution environments. A data processing plan is received from a client. The data processing plan defines how a data access request for specified data from within a distributed data set is to be executed across a plurality of compute nodes within the compute node cluster. The data processing plan includes a plurality of different stages. Each different stage defines a type of processing that is to be performed on data within the distributed data set.

The data processing plan is orchestrated on the compute node cluster by executing one or more of the plurality of different stages of the data processing plan. For each stage, one or more of the compute nodes are instructed to execute instructions against data within or derived from one or more data partitions of the distributed data set. For each stage, the one or more of the compute nodes are also instructed to catch any encountered unhandled exceptions occurring during execution of the instructions against the data within or derived from one more data partitions. Each unhandled exception indicates at least one of: a failure at a particular node or a failure at a particular stage of the data processing plan. For each stage, the one or more of the compute nodes are also instructed to store encountered unhandled exceptions along with corresponding auxiliary data in a designated storage location. The corresponding auxiliary data associates each of the unhandled exceptions with the data partition, from among the one or more data partitions, that lead to the unhandled exception.

Stored unhandled exceptions are harvested along with corresponding auxiliary data. The harvested unhandled exceptions are aggregated along with corresponding auxiliary data into one or more container objects. The one or more container objects convey details of compute node and stage failures that happened during orchestration of the data processing plan. The one or more container objects are sent to the client.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, hard drives, solid state drives (SSDs) based on RAM, Flash memory, phase-change memory (PCM), or other types of memory, optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In general, embodiments of the invention can be used in a distributed execution environment where a job is executed on behalf of a client. One example of a distributed execution environment is a distributed query processing system where a query is executed on behalf of a client. Distributed query processing systems include the Language Integrated Query ("LINQ") to High Performance Computing ("HPC") distributed query processing systems.

A job (e.g., a query) can include a series of computation steps that are executed on multiple compute nodes each processing parts of a larger data set. Unhandled exceptions can be caught while computations are running on data partitions of different compute nodes. Unhandled exception objects can be stored in a serialized format in a compute node's local storage (or an alternate central location) along with auxiliary details such as the data partition being processed at the time.

Stored serialized exception objects for a job can be harvested and aggregated in a single container object. The single container object can be passed back to the client. In some embodiments, the single contained object is passed back through an API which enables filtering based on i) computation step (stage), ii) compute node, iii) data partition.

Figure 1A:
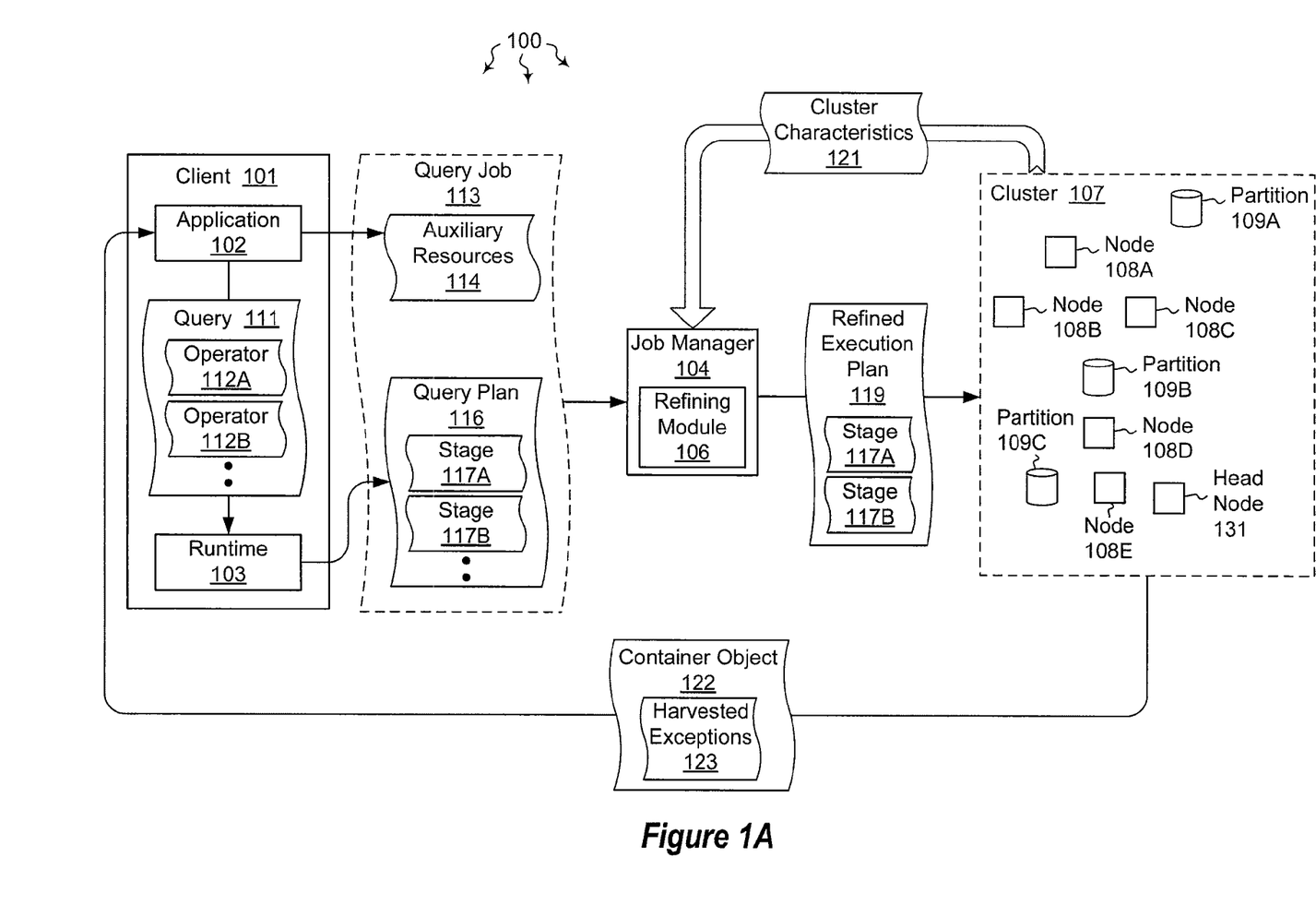
FIGS. 1A and 1B illustrates an example computer architecture that facilitates propagating unobserved exceptions in distributed execution environments.
Figure 1B:
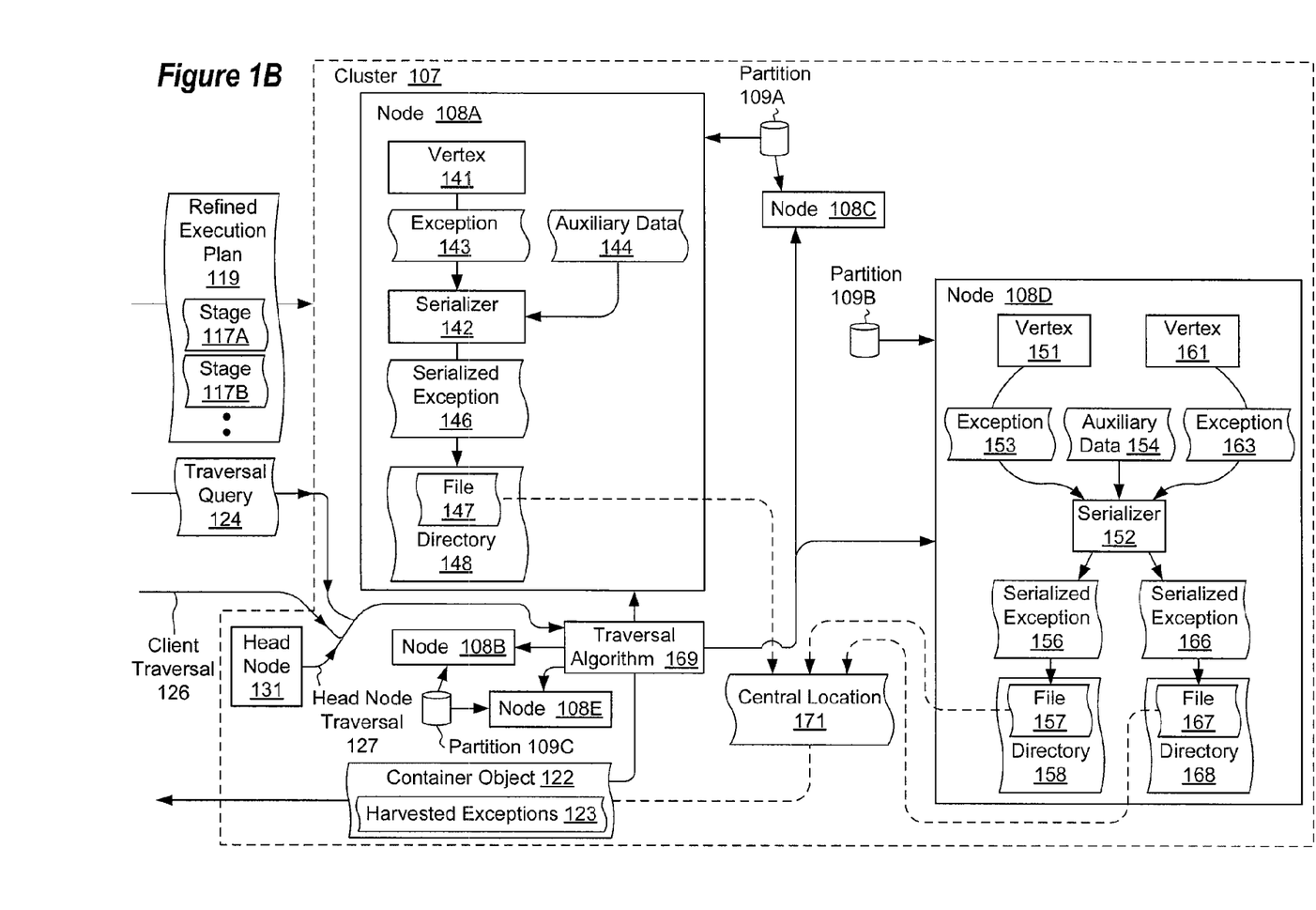

FIGS. 1A and 1B illustrate an example computer architecture 100 that facilitates propagating unobserved exceptions in distributed execution environments. Referring to FIG. 1A, computer architecture 100 includes client 101, job manager 104, and cluster 107. Each of the depicted components and computer systems is connected to one another over (or is part of) a network, such as, for example, a Local Area Network ("LAN"), a Wide Area Network ("WAN"), and even the Internet. Accordingly, each of the depicted components and computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Referring initially to FIG. 1A, client 101 includes application 102 and runtime 103. Generally, application 102 is configured to generate and output a description of actions (e.g., a query) that are to be executed in a distributed execution environment (e.g., cluster 107). Application 102 can be built using Application Program Interfaces ("API's") for a specified distributed execution environment (e.g., a distributed query processing environment). For example, application 102 can be built from a LINQ based query API for .NET languages as well as corresponding data partition and management APIs for interacting with a distributed execution environment, such as, for example cluster 107. A data processing plan can be a declarative query describing in a series of query steps (query operators) how data is to be processed. Each query step can include one or more user-defined processing functions (e.g., query operator delegates).

Runtime 103 is generally configured to receive a description of actions (e.g., a query) from client 102. Runtime 103 translates the description of actions into a job (e.g., a query job) specifying how the described actions are to be executed in a distributed execution environment (e.g., cluster 107). Runtime 103 outputs the job to job manager 104. The job can include a plan, such as, for example, a query plan, and auxiliary resources, such as, for example, static and generated binaries. The plan can include a graph of stages, each stage describing a type of processing that is to be performed on data. Some of the stages can run provided user-defined processing functions (e.g., query operator delegates). Within the graph of stages, input to intermediate stages can come from the output of previous stage(s).

As depicted, job manager 104 includes refining module 106. Generally, job manager 104 is configured to receive a job from runtime 103 and prepare the job for execution in a distributed execution environment (e.g., cluster 107). Refining module 106 can refine a job based on factors including but not limited to: available compute nodes, number of input data partitions, locations of data partitions with in a cluster, and network topology. A refined execution plan can fully specify which stages are to be executed by which nodes and with which multiplicity. For example, code for a given stage can be executed as multiple copies. Each execution of code (whether it be one or multiple) can be referred to as a vertex. Each vertex can be targeted to a specific partition of data.

Job manager 104 is also configured to orchestrate execution of a refined execution plan within a distributed execution environment (e.g., within cluster 107). If the client application (e.g., application 102) calls any APIs requesting access to the output of the job, these calls can block until the job is complete.

Generally, cluster 107 (e.g., a High-Performance Computing cluster) can include a cluster of computer systems configured to interoperate with one another and aggregate resources together to solve (e.g., different portions of larger and/or more complex) computations that would potentially overburden a single computer system. For example, as depicted, cluster 107 includes head node 131, compute nodes 108A-108E, and data partitions 109A-109C. Head node 131, compute nodes 108A-108E, and data partitions 109A-109C can interoperate to solve computations submitted from job manager 104. A cluster of computer systems can include a plurality of computer systems, such as, for example, 10s or even 100s of computer systems, having computational and storage resources.

In general, the stages of an execution plan are executed at different compute nodes and/or using different data partitions within cluster 107. As described, some stages of an execution plan can execute user-defined functions. The user-defined functions can run on provided data and can output further data. Any output data can be provided as input data to later stages of the execution plan. As such, exceptions that originate from within user-defined functions (as they run inside individual vertices on nodes) can interrupt the execution of the whole job. When an exception occurs in a user-defined function, client side APIs which are blocked on the completion of the job are unblocked and throw a generic exception or return a fail status code.

Within cluster 107, vertex entry points running on compute node are configured to catch unhandled exceptions from user provided (e.g., query operator) functions. The compute node can redirect unhandled exceptions to a central serializer routine. The central serializer routine can supplement the unhandled exceptions with auxiliary data, such as, for example, the data partition being processed at the time of the unhandled exception. The serializer routine can write out the unhandled exception/auxiliary data to a local file on the vertex working directory. A compute node can maintain a separate (unique) working directory for each vertex (e.g., when a computer node is executing multiple vertices for an execution plan). Alternatively, a compute node can write out unhandled exceptions/auxiliary data to a central location.

Subsequently, serialized unhandled exceptions/auxiliary data can be harvested. Exception harvesting can occur when a job fails or some other condition occurs. Exception harvesting can be implemented in a variety of different ways. A single traverser, such as, for example, client 101 or head node 131, can traverse file systems at each compute node visiting vertex working directories. Alternatively, a follow up execution plan can be submitted to cluster 107 to traverse file systems at each compute node visiting vertex working directories.

Further, it may be that serialized unhandled exceptions/auxiliary data are transferred back to a client (e.g., client 101) as they occur (or "on the fly"), without waiting for an execution pan to complete. Serialized unhandled exceptions/auxiliary data can be return to a client through a previously established communication channel (e.g., a notification API).

Unhandled exceptions/auxiliary data harvested from different compute nodes can be aggregated into a single container object that is returned to the client.

Figure 2:
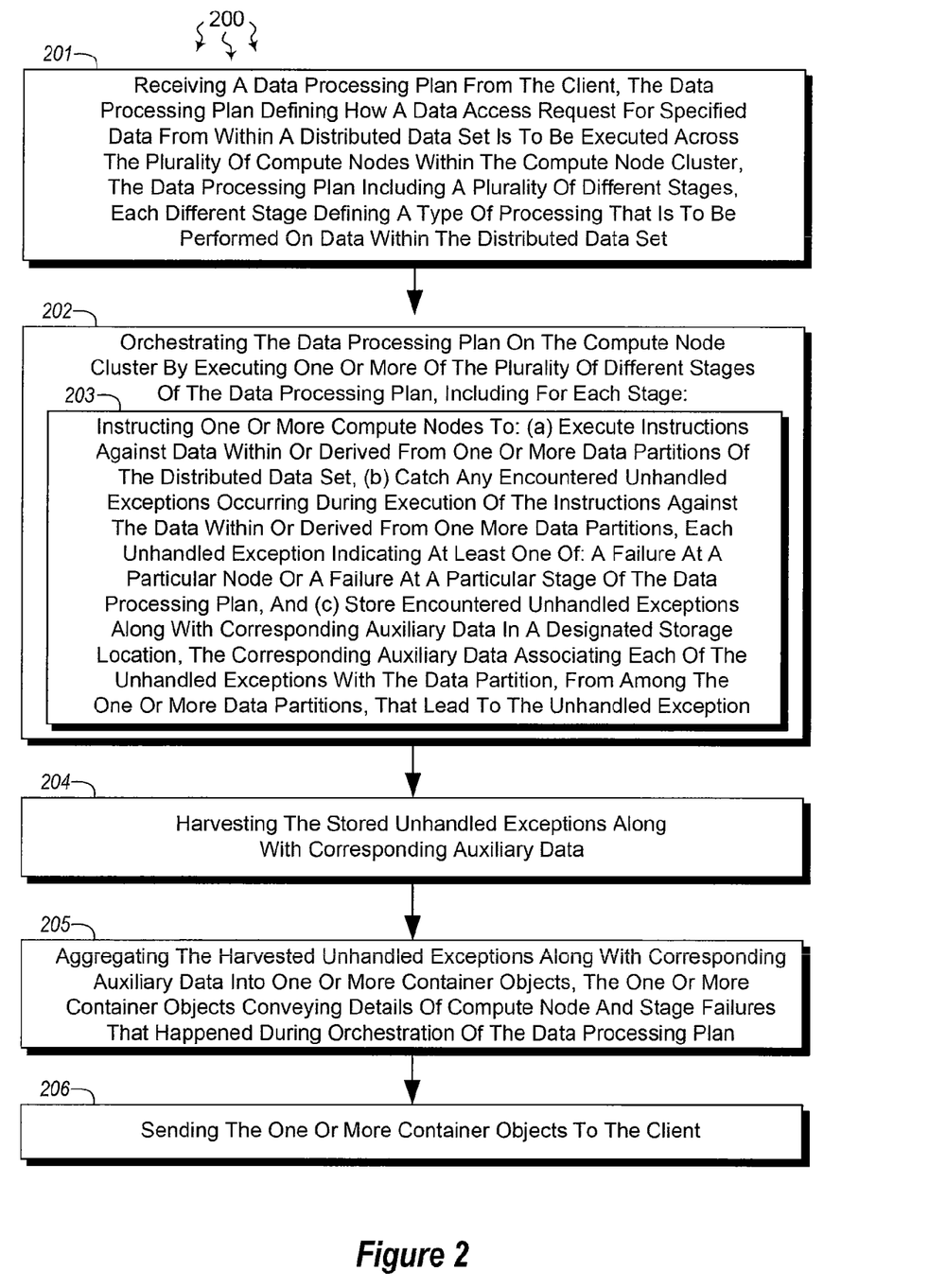
FIG. 2 illustrates a flow chart of an example method for propagating unobserved exceptions in distributed execution environments.

FIG. 2 illustrates a flow chart of an example method 200 for propagating unobserved exceptions in distributed execution environments. Method 200 will be described with respect to the components and data of computer architecture 100.

Accordingly, referring back to client 101, application 102 can generate and output query 111. Query 111 can include a plurality of query operators including query operator 112A, 112B, etc. Application 102 also outputs auxiliary resources 114, such as, for example, user defined functions.

Runtime 103 can receive query 111. Runtime 103 can generate an output query plan 116 from query 111. Query plan 116 includes a plurality of stages, including stages 116A, 116B, etc., for implementing operations 112A, 112B, etc. Each of the stages 116A, 116B, etc., can define a type of processing that is to be performed on data within a data set of cluster 107. Client 101 can combine query plan 116 and auxiliary resources 114 into query job 113. Job 113 can define that the input to at least one stage depends on the output from at least one other stage. For example, output form an earlier stage can be provided as input to a later stage. Thus generally, query job 113 defines how query 111 (i.e., a data access request for specified data from within a data set of cluster 107) is to be executed across the plurality of compute nodes within cluster 107.

Method 200 includes an act of receiving a data processing plan from the client, the data processing plan defining how a data access request for specified data from within the distributed data set is to be executed across the plurality of compute nodes within the compute node cluster, the data processing plan including a plurality of different stages, each different stage defining a type of processing that is to be performed on data within the distributed data set (act 201). For example, job manager 104 can receive query job 113. As appropriate, refining module 106 can refine query job 113 based on cluster characteristics 121. Cluster characteristics 121 can include one or more characteristics of cluster 107, such as, for example, available compute nodes in cluster 107, number of input data partition in cluster 107, locations of data partitions within cluster 107, and the network topology of cluster 107. Based on any appropriate refinements, job manager 104 can generate refined execution plan 119, including stages 117A, 117B, etc.

Method 200 includes an act of orchestrating the data processing plan on the compute node cluster by executing one or more of the plurality of different stages of the data processing plan, including for each stage (act 202). For example, job manager 104 can orchestrate refined execution plan 119 on cluster 107.

Act 202 includes act of instructing one or more compute nodes to: (a) execute instructions against data within or derived from one or more data partitions of the distributed data set, (b) catch any encountered unhandled exceptions occurring during execution of the instructions against the data within or derived from one more data partitions, each unhandled exception indicating at least one of: a failure at a particular node or a failure at a particular stage of the data processing plan, and (c) store encountered unhandled exceptions along with corresponding auxiliary data in a designated storage location, the corresponding auxiliary data associating each of the unhandled exceptions with the data partition, from among the one or more data partitions, that lead to the unhandled exception (act 203).

For example, turning now to FIG. 1B, refined execution plan 119 can be orchestrated (by job manager 104) to instruct node 108A to execute instructions represented by vertex 141 against data within or derived from partition 109A. Refined execution plan 119 can also instruct node 108A to catch any unhandled exceptions occurring during execution of vertex 141 against data within or derived from partition 109A. The unhandled exceptions can indicate a failure at node 108A or failure at a stage of refined execution plan 119. Refined execution plan 119 can further instruct node 108A to store any encountered unhandled exceptions along with corresponding auxiliary data in file 147 of directory 148. The corresponding auxiliary data associating each of the unhandled exceptions with data partition 109A.

During execution, it may be that vertex 141 encounters exception 143 corresponding to stage 117A. Vertex 141 can pass exception 143 to serializer 142. Serializer 142 can combine exception 143 with auxiliary data 144 into serialized exception 146. Auxiliary data 144 can indicate that data partition 109A was being processing when exception 143 occurred. Thus, serialized exception 146 indicates that an exception occurred at node 108A while executing instructions for stage 117A against data from data partition 109A. Serializer 142 can store serialized exception 146 in file 147 of directory 148.

Job manager 103 can orchestrate refined execution plan 119 to instruct node 108C to execute instructions similar to those of vertex 141 against data within or derived from partition 109A, catch unhandled exceptions, and store unhandled exceptions/auxiliary data in a file at node 108C.

Each vertex at a node can have a separate (unique) working directory for storing unhandled exceptions/auxiliary data. For example, job manager 103 can orchestrate refined execution plan 119 to instruct node 108D to execute instructions represented by vertex 151 and vertex 161 against data within or derived from partition 109B. Refined execution plan 119 can also instruct node 108B to catch any unhandled exceptions occurring during execution of vertex 151 and 161 against data within or derived from partition 109B. The unhandled exceptions can indicate a failure at node 108B or failure at a stage of refined execution plan 119. Refined execution plan 119 can further instruct node 108B to store any encountered unhandled exceptions along with corresponding auxiliary data in files in appropriate directories. For example, unhandled exceptions/auxiliary data form vertex 151 can be stored in file 157 of directory 158. On the other hand, unhandled exceptions/auxiliary data form vertex 161 can be stored in file 167 of directory 168. The corresponding auxiliary data can associate any the unhandled exceptions with data partition 109B.

During execution, it may be that vertex 151 encounters exception 153 corresponding to stage 117A. Vertex 151 can pass exception 153 to serializer 152. Serializer 152 can combine exception 153 with auxiliary data 154 into serialized exception 156. Auxiliary data 154 can indicate that data partition 109B was being processing when exception 153 occurred. Thus, serialized exception 156 indicates that an exception occurred at node 108B while executing instructions for stage 117A against data from data partition 109B. Serializer 152 can store serialized exception 156 in file 157 of directory 158.

Likewise, during execution, it may be that vertex 161 encounters exception 163 corresponding to stage 117B. Vertex 161 can pass exception 163 to serializer 162. Serializer 152 can combine exception 163 with auxiliary data 154 into serialized exception 166. Auxiliary data 154 can indicate that data partition 109B was being processing when exception 163 occurred. Thus, serialized exception 166 indicates that an exception occurred at node 108B while executing instructions for stage 117B against data from data partition 109B. Serializer 152 can store serialized exception 166 in file 167 of directory 168.

Job manager 103 can also orchestrate refined execution plan 119 to instruct nodes 108B and 108E to execute instructions against data within or derived from partition 109C, catch unhandled exceptions, and store unhandled exceptions/auxiliary data in appropriate files.

Serializer 142 and 152, as well at serializers at other compute nodes, can implement a central serializer routine.

In some embodiments, method 200 includes a further act of detecting interruption of the data processing plan, the data processing plan interrupted based on one or more unhandled exceptions. For example, job manager 104 can detect interruption of refined execution plan 119 based on one or more of unhandled exceptions 143, 153, and 163. Job manager 104 can indicate interruption of refined execution plan 119 to client 101 and/or head node 131.

Method 200 includes an act of harvesting the stored unhandled exceptions along with corresponding auxiliary data (act 204). In embodiments that include the further act of detecting interruption of the data processing plan, harvesting of stored unhandled exceptions along with corresponding auxiliary data can occur in response to detecting the interruption. Method 200 includes an act of aggregating the harvested unhandled exceptions along with corresponding auxiliary data into one or more container objects, the one or more container objects conveying details of compute node and stage failures that happened during orchestration of the data processing plan (act 205). For example, serialized exceptions 146, 156, and 166, as well as any unhandled exceptions in other directories at compute nodes 108A and 108D and unhandled exceptions at compute nodes 108B, 108C, and 108E can be harvested. Serialized exceptions contain an unhandled exception along with appropriate auxiliary data. Serialized exceptions 146, 156, and 166 and any other serialized exceptions can be aggregated into harvested exceptions 123. Harvested exceptions 123 can be placed within container object 122. Accordingly, container object 122 coveys the details of compute node (e.g., 108A and 108D) failures and stage (e.g., 117A and 117B) failures observed during orchestration of refined execution plan 119.

Exception harvesting and aggregation can occur in a variety of different ways. In some embodiments, a traversal algorithm traverses compute node directories to harvest files containing unhandled exceptions. As depicted in FIG. 1B, traversal algorithm 169 traverses directories at each of computer nodes 108A, 108B, 108C, 108D, and 108E for files containing unhandled exceptions. For example, traversal algorithm 169 can traverse directories 148, 158, and 168 to harvest files 147, 157, and 167 respectively. Traversal algorithm 169 can deserialize and aggregate the contents files 147, 157, and 167 as harvested exceptions 123. Traversal algorithm 169 can pace harvested exceptions 123 into container object 122.

Traversal algorithm 169 can be invoked in a variety of different ways. For example, client 101 can invoke traversal algorithm 169 (as indicated by client traversal 126). When client 101 does not have direct access to compute nodes of cluster 107, for example, due to security settings, a proxy can invoke traversal algorithm 169. For example, head node 131 can invoke traversal algorithm 169 (as indicated by head node traversal 127) on behalf of client 101.

In other embodiments, a follow up query is used to discover serialized exceptions at compute nodes. The follow up query runs on a single vertex on each compute node to check the local file system for serialized exception files. For example, traversal query 124 can be run on each compute node of cluster 107 to check for files. Any detected files can be copied to central location 171 for subsequent deserialization. For example, files 147, 157, and 167 can be copied to centralized location 171. Files 147, 157, and 167 can be later deserialized and aggregated as harvested exceptions 123 into container object 122. Alternatively, traversal query 124 can invoke traversal algorithm 169.

Other embodiments include traversal algorithm 169 copying files to central location 171 for subsequent deserialization and aggregation.

Embodiments of the invention also include "on the fly" transmission of serialized exceptions. For example, serialized exceptions 146, 156, and 166 can be transferred to client 101 without waiting for completion of refined execution plan 119. On the fly transmission allows client 101 to receive and act upon serialized exceptions sooner.

Method 200 includes an act of sending the one or more container objects to the client (act 206). For example, returning to FIG. 1A, container object 122 containing harvested exceptions 123, can be sent to client 101. Harvested exceptions 123 can be returned back to client 101 using a client API. In some embodiments, an Aggregate Exception is thrown from blocked client side APIs, such as, for example, from entry points like Execute( ) or DistributedData.GetEnumerator( ). Other embodiments use a notification API, which invokes user callbacks as new groups of exceptions are transmitted from compute nodes to the client side.

The follow code example represents how a final harvested exception can be thrown to user APIs:

```
class AggregateException
{
...
    ReadOnlyCollection<Exception> InnerExceptions; //
...
}
```

Each entry in the InnerExceptions property can be thrown from (e.g., LINQ to HPC) query APIs and be of type DistributedQueryVertexException.

```
class DistributedQueryVertexException
{
...
    Exception VertexException; // actual exception thrown from vertex
    code.
    int VertexID; // the unique ID of the vertex where this exception
    occurred
    string ComputeNode; // which node the exceptional vertex was
    running
    string VertexWorkingDir; // full path to working directory
...
}
```

Thus, embodiments of the invention can throw an AggregateException object from blocked APIs. The AggregateException object conveys details of failures that happened while a job is and/or was executing on a cluster.

Client 101 can filter harvested exceptions 123 for exceptions relating to different aspects of executing refined execution plan 119 within cluster 107. For example, client 101 can filter harvested exceptions 123 for exceptions corresponding to a specified stage (e.g., 117A, 117B, etc) of refined execution plan 119, for exceptions corresponding to a specified node (108A, 108B, etc.), or for exceptions corresponding to a specified data partition (109A, 109B, etc.), The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a distributed data processing system, the distributed data processing system including a client, a distributed data set, and a compute node cluster, the distributed data set partitioned into a plurality of data partitions, the compute node cluster including a plurality of compute nodes, a method for propagating unhandled exceptions from the plurality of compute nodes to the client, the method comprising:

an act of receiving a data processing plan from the client, the data processing plan defining how a data access request for specified data from within the distributed data set is to be executed across the plurality of compute nodes within the compute node cluster, the data processing plan including a plurality of different stages, each different stage defining a type of processing that is to be performed on data within the distributed data set;

an act of orchestrating the data processing plan on the compute node cluster by executing one or more of the plurality of different stages of the data processing plan, including for each stage:

an act of instructing one or more compute nodes to: (a) execute instructions against data within or derived from one or more data partitions of the distributed data set, (b) catch any encountered unhandled exceptions occurring during execution of the instructions against the data within or derived from one more data partitions, each unhandled exception indicating at least one of: a failure at a particular node or a failure at a particular stage of the data processing plan, and (c) store encountered unhandled exceptions along with corresponding auxiliary data in a designated storage location, the corresponding auxiliary data associating each of the unhandled exceptions with the data partition, from among the one or more data partitions, that lead to the unhandled exception;

an act of harvesting stored unhandled exceptions along with corresponding auxiliary data;

an act of aggregating the harvested unhandled exceptions along with corresponding auxiliary data into one or more container objects, the one or more container objects conveying details of compute node and stage failures that happened during orchestration of the data processing plan; and an act of sending the one or more container objects to the client.

2. The method as recited in claim 1, wherein the act of receiving a data processing plan from the client comprises an act of receiving a query job from the client, the query job including a query plan having a plurality of stages and including one or more user defined functions.

3. The method as recite in claim 1, further comprising prior to orchestrating the data processing plan, an act of refining the data processing plan based on characteristics of the compute node cluster and/or based on characteristics of the data partitions.

4. The method as recited in claim 3, wherein an act of refining the data processing plan comprises an act of refining the data processing plan based on one or more of: available compute nodes in the compute node cluster, number of input data partitions in the computer node cluster, locations of data partitions within the computer node cluster, and the network topology of the compute node cluster.

5. The method as recited in claim 1, wherein the act of harvesting stored unhandled exceptions along with corresponding auxiliary data comprises an act of the client traversing file systems on each compute node that participated in the data processing plan.

6. The method as recited in claim 1, wherein the act of harvesting stored unhandled exceptions along with corresponding auxiliary data comprises an act of a head node for the compute node cluster traversing file systems on each compute node that participated in the data processing plan.

7. The method as recited in claim 1, wherein the act of harvesting stored unhandled exceptions along with corresponding auxiliary data comprises an act of orchestrating a follow up data processing plan to copy stored unhandled exceptions along with corresponding auxiliary data to a central location.

8. The method as recited in claim 1, wherein the act of harvesting stored unhandled exceptions along with corresponding auxiliary data comprises an act of harvesting stored unhandled exceptions along with corresponding auxiliary data while the data processing plan is executing.

9. The method as recited in claim 1, wherein further comprising an act of detecting interruption of the data processing plan, the data processing plan interrupted based on one or more unhandled exceptions; and wherein the act of harvesting stored unhandled exceptions along with corresponding auxiliary data comprises and act of harvesting stored unhandled exceptions along with corresponding auxiliary data in response to detecting interruption of the data processing plan.

10. The method as recited in claim 1, wherein the act of sending the one or more container objects to the client comprises an act of throwing an aggregate exception from client side Application Program Interfaces ("APIs").

11. The method as recited in claim 1, wherein the act of sending the one or more container objects to the client comprises an act of sending the one or more container objects through a notification API.

12. A computer program product for use in a distributed data processing system, the distributed data processing system including a client, a distributed data set, and a compute node cluster, the distributed data set partitioned in to a plurality of data partitions, the compute node cluster including a plurality of compute nodes, the computer program product for implementing a method for propagating unhandled exceptions from the plurality of compute nodes to the client, the computer program product comprising one or more computer storage devices having stored thereon computer-executable instructions that, when executed at a processor, cause the distributed data processing system to perform the method, including the following:

receive a data processing plan from the client, the data processing plan defining how a data access request for specified data from within the distributed data set is to be executed across the plurality of compute nodes within the compute node cluster, the data processing plan including a plurality of different stages, each different stage defining a type of processing that is to be performed on data within the distributed data set;

orchestrate the data processing plan on the compute node cluster by executing one or more of the plurality of different stages of the data processing plan, including for each stage:

instructing one or more compute nodes to: (a) execute instructions against data within or derived from one or more data partitions of the distributed data set, (b) catch any encountered unhandled exceptions occurring during execution of the instructions against the data within or derived from one more data partitions, each unhandled exception indicating at least one of: a failure at a particular node or a failure at a particular stage of the data processing plan, and (c) store encountered unhandled exceptions along with corresponding auxiliary data in a designated storage location, the corresponding auxiliary data associating each of the unhandled exceptions with the data partition, from among the one or more data partitions, that lead to the unhandled exception;

detect interruption of the data processing plan, the data processing plan interrupted based on the one or more of unhandled exceptions;

harvest the stored unhandled exceptions along with corresponding auxiliary data in response to interruption of the data processing plan;

aggregate the harvested unhandled exceptions along with corresponding auxiliary data into one or more container objects, the one or more container objects conveying details of compute node and stage failures that happened during orchestration of the data processing plan; and send the one or more container objects to the client.

13. The computer program product as recited in claim 12, wherein computer-executable instructions that, when executed, cause the distributed data processing system to receiving a data processing plan from the client comprise computer-executable instructions that, when executed, cause the distributed data processing system to receive a query job from the client, the query job including a query plan having a plurality of stages and including one or more user defined functions.

14. The computer program product as recited in claim 12, further comprising computer-executable instructions that, when executed, cause the distributed data processing system to refine the data processing plan based on characteristics of the compute node cluster and/or based on characteristics of the data partitions.

15. The computer program product as recited in claim 12, wherein computer-executable instructions that, when executed, cause the distributed data processing system to harvest stored unhandled exceptions along with corresponding auxiliary data comprise computer-executable instructions that, when executed, cause the distributed data processing system to receive a client traversal of file systems on each compute node that participated in the data processing plan.

16. The computer program product as recited in claim 12, wherein computer-executable instructions that, when executed, cause the distributed data processing system to harvest stored unhandled exceptions along with corresponding auxiliary data comprise computer-executable instructions that, when executed, cause a head node for the compute node cluster to traverse file systems on each compute node that participated in the data processing plan.

17. The computer program product as recited in claim 12, wherein computer-executable instructions that, when executed, cause the distributed data processing system to harvest stored unhandled exceptions along with corresponding auxiliary data comprise computer-executable instructions that, when executed, cause the distributed data processing system to orchestrate a follow up data processing plan to copy stored unhandled exceptions along with corresponding auxiliary data to a central location.

18. A distributed data processing system, the distributed data processing system comprising a client, a job manager, and a compute node cluster, wherein the compute node cluster includes a plurality of computer nodes and data partitions, each compute node including one or more processors and system memory, each compute node configured to execute code based on received instructions from the job manager;

wherein the client includes an application and a client runtime, the application being configured to generate a query having a plurality of query operators and one or more user defined functions, the client runtime being configured to receive the query and formulate at query plan from the query, the query plan having plurality of stages, wherein the client is configured to combine the query plan and user defined functions into a query job;

wherein the job manager is configured to:
receive the query job and refine the query job into a refined execution plan for execution within the compute node cluster; and orchestrate the refined execution plan on the compute node cluster by executing one or more of the plurality of different stages of the data processing plan, including for each stage:

instructing one or more compute nodes to: (a) execute instructions against data within or derived from one or more data partitions of a distributed data set, (b) catch any encountered unhandled exceptions occurring during execution of the instructions against the data within or derived from one more data partitions, each unhandled exception indicating at least one of: a failure at a particular node or a failure at a particular stage of the data processing plan, and (c) store encountered unhandled exceptions along with corresponding auxiliary data in a designated storage location, the corresponding auxiliary data associating each of the unhandled exceptions with the data partition, from among the one or more data partitions, that lead to the unhandled exception; and wherein each of the one or more compute nodes runs vertices in accordance with the refined execution plan to (a) execute instructions against one or more data partitions, (b) catch any unhandled exceptions, and (c) serialize encountered unhandled exceptions along with corresponding auxiliary data in the designated storage location; and wherein at least one vertex catches an unhandled exception, serializes the unhandled exception into a serialized unhandled exception including corresponding auxiliary data, and stores the serialized unhandled exception for harvesting.

19. The distributed data processing system of claim 18, wherein designated locations for storing unhandled exceptions are vertex directories at the one or more compute nodes.

20. The distributed data processing system of claim 18, wherein the application being configured to generate a query having a plurality of query operators comprises the application being configured to generate a LINQ to HPC query.

* * * * *